(12) United States Patent
Shikano et al.

(10) Patent No.: US 8,635,263 B2
(45) Date of Patent: Jan. 21, 2014

(54) NODE PROCESSING DEVICE AND ITS PROCESSING METHOD

(75) Inventors: Hiroaki Shikano, Tachikawa (JP); Yuji Ogata, Saitama (JP)

(73) Assignee: Hitachi, Ltd., Tokyo (JP)

( * ) Notice: Subject to any disclaimer, the term of this patent is extended or adjusted under 35 U.S.C. 154(b) by 94 days.

(21) Appl. No.: 13/097,106

(22) Filed: Apr. 29, 2011

(65) Prior Publication Data

US 2011/0289133 A1 Nov. 24, 2011

(30) Foreign Application Priority Data

May 21, 2010 (JP) .................................. 2010-117416

(51) Int. Cl.
*G06F 15/16* (2006.01)

(52) U.S. Cl.
USPC ........... 709/202; 709/220; 709/224; 709/229; 370/328

(58) Field of Classification Search
USPC .................. 709/202, 220, 224, 229; 370/328
See application file for complete search history.

(56) References Cited

U.S. PATENT DOCUMENTS

| | | | |
|---|---|---|---|
| 7,761,532 B2 * | 7/2010 | Moriwaki | 709/217 |
| 2007/0185646 A1 * | 8/2007 | Neugebauer et al. | 701/201 |
| 2008/0055113 A1 * | 3/2008 | Muro et al. | 340/870.16 |
| 2008/0288636 A1 * | 11/2008 | Moriwaki | 709/224 |
| 2009/0271529 A1 * | 10/2009 | Kashiyama et al. | 710/1 |
| 2010/0114527 A1 * | 5/2010 | Lee | 702/181 |

FOREIGN PATENT DOCUMENTS

| | | |
|---|---|---|
| JP | 11-252670 A | 9/1999 |
| JP | 2005-352769 A | 12/2005 |

OTHER PUBLICATIONS

H. Shikano et al., Proposal and Evaluation of Efficient Sensing Information Integration Technique, IEICE Technical Report, vol. 109, No. 436, CS2009-81, pp. 47-52, Mar. 2010.
M. Okuno et al., A Study on Distributed Information and Communication Processing Architecture for Next Generation Cloud System, IEICE Technical Report, vol. 109, No. 448, NS2009-204, pp. 241-246, Mar. 2010.

* cited by examiner

*Primary Examiner* — Wing F Chan
*Assistant Examiner* — Hitesh Patel
(74) *Attorney, Agent, or Firm* — Mattingly & Malur, PC

(57) ABSTRACT

When the multiple sensors monitored by a sensor management unit, input sensor information into the entrance node, a sensor type identifier unit utilizes a buffer management table to buffer the data according to the sensor type. A start decision unit utilizes a processing start setting table containing accumulated start conditions for each application to execute the computation processing required by the processor units for processing the buffered sensor data according to the required application. A transmit condition decision unit decides whether or not to transmit the computation results to an external device or a CPU, and based on those decision results, transmits the computation results to the CPU or the upstream intelligent node.

14 Claims, 15 Drawing Sheets

FIG. 5

| SERVICE ID | SENSOR ID | SENSOR GROUP ID | PROCESSING ID | START TYPE | START CONDITIONS | MODE | PRIORITY | TRANSMIT ID |
|---|---|---|---|---|---|---|---|---|
| 0 | 0 | - | 0 | TIME | 100ms | ACC | 1 | 0 |
| 1 | 1 | - | 0 | DATA COUNT | 50 | ACC | 10 | 1 |
| 2 | GR | 1 | 1 | TIME | 1000ms | SMPL | 10 | 2 |
| ... | ... | ... | ... | ... | ... | ... | ... | ... |

| SENSOR GROUP ID | SENSOR ID1 | SENSOR ID2 | SENSOR ID3 | SENSOR ID4 | SENSOR ID5 |
|---|---|---|---|---|---|
| 0 | 0 | 1 | 2 | NA | NA |
| 1 | 0 | 3 | NA | NA | NA |
| 2 | 4 | 5 | 6 | 7 | NA |
| ... | ... | ... | ... | ... | ... |

| PROCESSOR ID | FIRST PROCESSOR START BLOCK | SECOND PROCESSOR START BLOCK | THIRD PROCESSOR START BLOCK | FOURTH PROCESSOR START BLOCK | FIFTH PROCESSOR START BLOCK |
|---|---|---|---|---|---|
| 0 | 0 | OUT | NA | NA | NA |
| 1 | 2 | 4 | OUT | NA | NA |
| 2 | 1 | 3 | OUT | NA | NA |
| ... | ... | ... | ... | ... | ... |

FIG. 8

| TRANSMIT ID | TRANSMIT DESTINATION | TRANSMIT TYPE | TRANSMIT CONDITION ID | TRANSMIT DESTINATION IP ADRS | TRANSMIT DESTINATION PORT |
|---|---|---|---|---|---|
| 0 | CPU1 | PROCESSING RESULTS | ANY | – | – |
| 1 | EXTERNAL | PROCESSING RESULTS | 2 | 192.168.0.2 | 2038 |
| 2 | EXTERNAL | EVENT | 4 | 192.168.0.7 | 3024 |
| 3 | EXTERNAL | BUFFER DATA | 1 | 192.168.0.3 | 3389 |
| ... | ... | ... | ... | ... | ... |

FIG. 9

| TRANSMIT CONDITION ID | COMPARATOR | SETTING VALUE |
|---|---|---|
| 0 | LT | 10 |
| 1 | MT | 20 |
| 2 | EQ | 20 |
| 3 | LTE | 10 |
| 4 | NEQ | 0 |
| 5 | MTE | 30 |
| ... | ... | ... |

| SENSOR ID | SENSOR TYPE | TRANSMISSION RATE (ACQUISITION RATE) | BUFFER ID | SENSOR IDENTIFIER | SENSOR STATUS |
|---|---|---|---|---|---|
| 0 | TEMPERATURE | 100ms | 0 | 192.168.1.1 | ACTIVE |
| 1 | TEMPERATURE | 1000ms | 1 | 192.168.1.2 | ACTIVE |
| 2 | HUMIDITY | 10s | 2 | 192.168.1.3 | INACTIVE |
| 3 | POSITION | 5s | 3 | 192.168.1.4 | ACTIVE |
| ... | ... | ... | ... | ... | ... |

| BUFFER ID | SIZE [BYTES] | LEAD POSITION (BYTE ADDRESS) | TAIL POSITION (BYTE ADDRESS) | UNIT DATA SIZE [BYTES] | LATEST DATA POINTER (BYTE ADDRESS) | LATEST DATA TIME STAMP | TAIL DATA TIME STAMP |
|---|---|---|---|---|---|---|---|
| 0 | 1,024 | 0 | 1,023 | 2 | 767 | 5,320 | 1,220 |
| 1 | 16,384 | 1,024 | 17,407 | 4,096 | 2,388 | 13,220 | 250 |
| 2 | 4,096 | 17,408 | 21,503 | 4 | 1,744 | 4,119 | 1,900 |
| 3 | 8,192 | 21,504 | 29,695 | 8 | 3,256 | 2,110 | 10 |
| ... | ... | ... | ... | ... | ... | ... | ... |

| SENSOR ID | SENSOR TYPE | TRANSMISSION RATE (ACQUISITION RATE) | BUFFER ID | SENSOR IP OR ID | SENSOR STATUS |
|---|---|---|---|---|---|
| 0 | TEMPERATURE | 2s | 0 | 192.168.1.1 | ACTIVE |
| 1 | TEMPERATURE | 10s | 1 | 192.168.1.2 | ACTIVE |
| 2 | TEMPERATURE | 10s | 2 | 192.168.1.3 | ACTIVE |
| 3 | TEMPERATURE | 10s | 3 | 192.168.1.4 | ACTIVE |
| 4 | TEMPERATURE | 10s | 4 | 192.168.1.5 | ACTIVE |
| 5 | TEMPERATURE | 10s | 5 | 192.168.1.6 | ACTIVE |

| BUFFER ID | REGION SIZE [BYTES] | LEAD POSITION (BYTE ADDRESS) | TAIL POSITION (BYTE ADDRESS) | UNIT DATA SIZE [BYTES] | LATEST DATA POINTER (BYTE ADDRESS) | LATEST DATA TIME STAMP | TAIL DATA TIME STAMP |
|---|---|---|---|---|---|---|---|
| 0 | 5,120 | 0 | 5,119 | 2 | 1,000 | 500 | 0 |
| 1 | 1,024 | 5,120 | 6,143 | 2 | 5,320 | 100 | 0 |
| 2 | 1,024 | 6,144 | 7,167 | 2 | 6,344 | 100 | 0 |
| 3 | 1,024 | 7,168 | 8,191 | 2 | 7,368 | 100 | 0 |
| 4 | 1,024 | 8,192 | 9,215 | 2 | 8,392 | 100 | 0 |
| 5 | 1,024 | 9,216 | 10,239 | 2 | 9,416 | 100 | 0 |

| SENSOR GROUP ID | SENSOR ID1 | SENSOR ID2 | SENSOR ID3 | SENSOR ID4 | SENSOR ID5 |
|---|---|---|---|---|---|
| 0 | 1 | 2 | 3 | 4 | 5 |

| SERVICE ID | SENSOR ID | SENSOR GROUP ID | PROCESSING ID | START TYPE | START CONDITIONS | MODE | PRIORITY | TRANSMIT ID |
|---|---|---|---|---|---|---|---|---|
| 0 | GR | 0 | 0 | TIME | 60s | ACC | 1 | 0 |
| 1 | 0 | – | 1 | TIME | 300s | ACC | 5 | 1 |
| 2 | 0 | – | 2 | DATA COUNT | 1 | SMPL | 10 | 2 |

| PROCESSOR ID | FIRST PROCESSOR START BLOCK | SECOND PROCESSOR START BLOCK | THIRD PROCESSOR START BLOCK | FOURTH PROCESSOR START BLOCK | FIFTH PROCESSOR START BLOCK |
|---|---|---|---|---|---|
| 0 | 0 | OUT | NA | NA | NA |
| 1 | 1 | 2 | OUT | NA | NA |
| 2 | OUT | NA | NA | NA | NA |
| ... | ... | ... | ... | ... | ... |

FIG. 21

| TRANSMIT ID | TRANSMIT DESTINATION | TRANSMIT TYPE | TRANSMIT CONDITION ID | TRANSMIT DESTINATION IP ADRS | TRANSMIT DESTINATION PORT |
|---|---|---|---|---|---|
| 0 | EXTERNAL | PROCESSING RESULTS | ANY | 10.0.0.5 | 2001– |
| 1 | CPU0 | PROCESSING RESULTS | ANY | – | – |
| 2 | EXTERNAL | EVENT | 0 | 10.0.0.6 | 2039 |

FIG. 22

| TRANSMIT CONDITION ID | COMPARATOR | SETTING VALUE |
|---|---|---|
| 0 | MTE | 50 |

NODE PROCESSING DEVICE AND ITS PROCESSING METHOD

CLAIM OF PRIORITY

The present application claims priority from Japanese patent application JP 2010-117416 filed on May 21, 2010, the content of which is hereby incorporated by reference into this application.

FIELD OF THE INVENTION

The present invention relates to a node device and relates in particular to an information processing technology for efficiently filtering plural types of sensor information at the network end point.

BACKGROUND OF THE INVENTION

The cloud computing services currently undergoing a rapid and continual growth provide users with centralized processing resources over networks via remote data centers that perform information processing of data such as sensor information. Cloud computing services therefore create problems in network communication such as lower reliability, greater response delays, and low energy efficiency.

Aware of these problems with centralizing information processing such as of sensor information at a single data center point, the present inventors made repeated studies on ways to eliminate the above problems by performing information processing such as of sensor information as near as possible to the information source (See Hiroaki Shikano and others, "Proposal and Evaluation of Efficient Sensing Information Technique", IEICE technical report, vol. 109, no. 436, CS2009-81, pp. 47-52, March 2010; and Michitaka Okuno and others, "A Study on Distributed Information and Communication Processing Architecture for Next Generation Cloud System", IEICE technical report, vol. 109, no. 448, NS2009-204, pp. 241-146, March 2010).

One example of a technology for pooling of sensor information is a sensor terminal device for remote monitoring control systems of the related art that notifies a management computer over the Internet when specified conditions in the results processed from the sensor output were fulfilled (See Japanese Unexamined Patent Publication No. Hei11 (1999)-252670).

SUMMARY OF THE INVENTION

Next generation cloud computing will require information processing combined with information accumulated on the cloud and real-time information from sensors coupled by a network possessing plural types of diverse sensors as well as from information terminals. However, clustering a large quantity of sensor information at the data center causes the problem of deteriorated power efficiency and response times due to the increased network traffic.

The technology disclosed by Hiroaki Shikano and others, "Proposal and Evaluation of Efficient Sensing Information Technique", IEICE technical report, vol. 109, no. 436, CS2009-81, pp. 47-52, March 2010; and by Michitaka Okuno and others, "A Study on Distributed Information and Communication Processing Architecture for Next Generation Cloud System", IEICE technical report, vol. 109, no. 448, NS2009-204, pp. 241-146, March 2010 propose a reflective network for achieving high-speed response, high reliability, and saving energy by dispersing the information processing and filtering of sensor information over the network. These technologies also propose a high-efficiency sensor information clustering technology for lowering the volume of traffic sent upstream by transmission sequence control of results and by filtering of sensor information by installing an entrance node at the boundary coupled to the sensors on the reflective network. However, though these documents disclose a basic structure for the entrance node, there is no description of a specific detailed structure and no description of specific utilization of this technology for high-efficiency clustering of sensor information. Moreover, the sensor terminal device in Japanese Unexamined Patent Publication No. Hei11 (1999)-252670 amounts to nothing than a disclosure of sensor information processing for one application called remote monitor control.

Rather than the above, the high-efficiency processing of sensor information by the entrance node to handle all types of requests from the user along with multiple applications stemming from cloud computing services is likely to prove an important issue.

In order to resolve the above problems with the related art, the present invention has the object of providing and node device and node processing method for cluster processing of sensor information required to handle multiple applications and all types of user requests.

Another object of the present invention is to provide a reflective network system for performing optimal processing on the network according to the composition of the information and position on the network, by installing dispersed information processing mechanisms on the network that are continuously linked to the data center.

To achieve the aforementioned objects, the present invention is a node device that sends data over a network corresponding to multiple applications, and with the node device including: a sensor type identifier unit to receive sensor data from multiple sensors and identify the multiple sensor types; a buffering unit to accumulate the sensor data in each type based on identification results from the sensor type identifier unit; and a processor unit to perform computation processing on each of the sensor data accumulated in the buffering unit, according to the processing start conditions that match the required application; and a transmit condition decision unit to judge the transmit conditions for the computation results based on computation results from the processing unit.

To also achieve the aforementioned objects, the present invention is an information processing method handling multiple applications in a node device that receives sensor information from the sensors coupled over a network to an upstream node, in which the node device received sensor data from multiple sensors, identifies the type of sensor data from the plural sensors, performs computation processing on each of the sensor data according to the processing start condition for each required application for the identified sensor data, decides the type of transmit conditions for the computation results based on results from that computation processing, and transmits the computation results.

To further achieve the aforementioned objects, according to an aspect of the present invention, a node device that transmits data corresponding to multiple applications providing various types of services to users over a network, includes: a sensor type identifier unit to receive sensor data from multiple sensors and identify the multiple sensor types; a buffering unit to accumulate the sensor data in each type based on identification results from the sensor type identifier unit; a start decision unit to decide the start of processing/computation for sensor data buffered in the buffering unit corresponding to each required application based on the processing start setting table that accumulates start conditions for each application; a processor unit to execute computation processing on each of the sensor data based on decision results from the start decision unit; and a transmit condition decision unit to decide the transmit conditions for judging computation results based on calculation results in the processor unit.

The present invention therefore provides an information processing method and a node device capable of high-efficiency processing in each application of sensor information required in multiple applications matching diverse requests from users.

BRIEF DESCRIPTION OF THE DRAWINGS

FIG. 5 is a drawing showing an example of the processing start setting table in the first embodiment;

FIG. 6 is a drawing showing an example of the sensor group table in the first embodiment;

FIG. 7 is a drawing showing an example of a processing routing table in the first embodiment;

FIG. 8 is a drawing showing an example of the transmit condition table in the first embodiment;

FIG. 9 is a drawing showing an example of the transmit condition comparator table in the first embodiment;

FIG. 10 is a drawing showing an example of the sensor management table in the first embodiment;

FIG. 11 is a drawing showing an example of the buffer management table in the first embodiment;

FIG. 15 is a drawing showing an example of the temperature sensor management table in an example applied in the first embodiment;

FIG. 16 is a drawing showing an example of the buffer management table in an example applied in the first embodiment;

FIG. 18 is a drawing showing an example of a sensor group table in an example applied in the first embodiment;

FIG. 19 is a drawing showing an example of the processing start setting table in an example applied in the first embodiment;

FIG. 20 is a drawing showing an example of the processing routing table in an example applied in the first embodiment;

FIG. 21 is a drawing showing an example of the processing destination specifier table in an example applied in the first embodiment; and FIG. 22 is a drawing showing an example of the transmit condition comparator table in an example applied in the first embodiment;

DETAILED DESCRIPTION OF THE PREFERRED EMBODIMENTS

Figure 1:
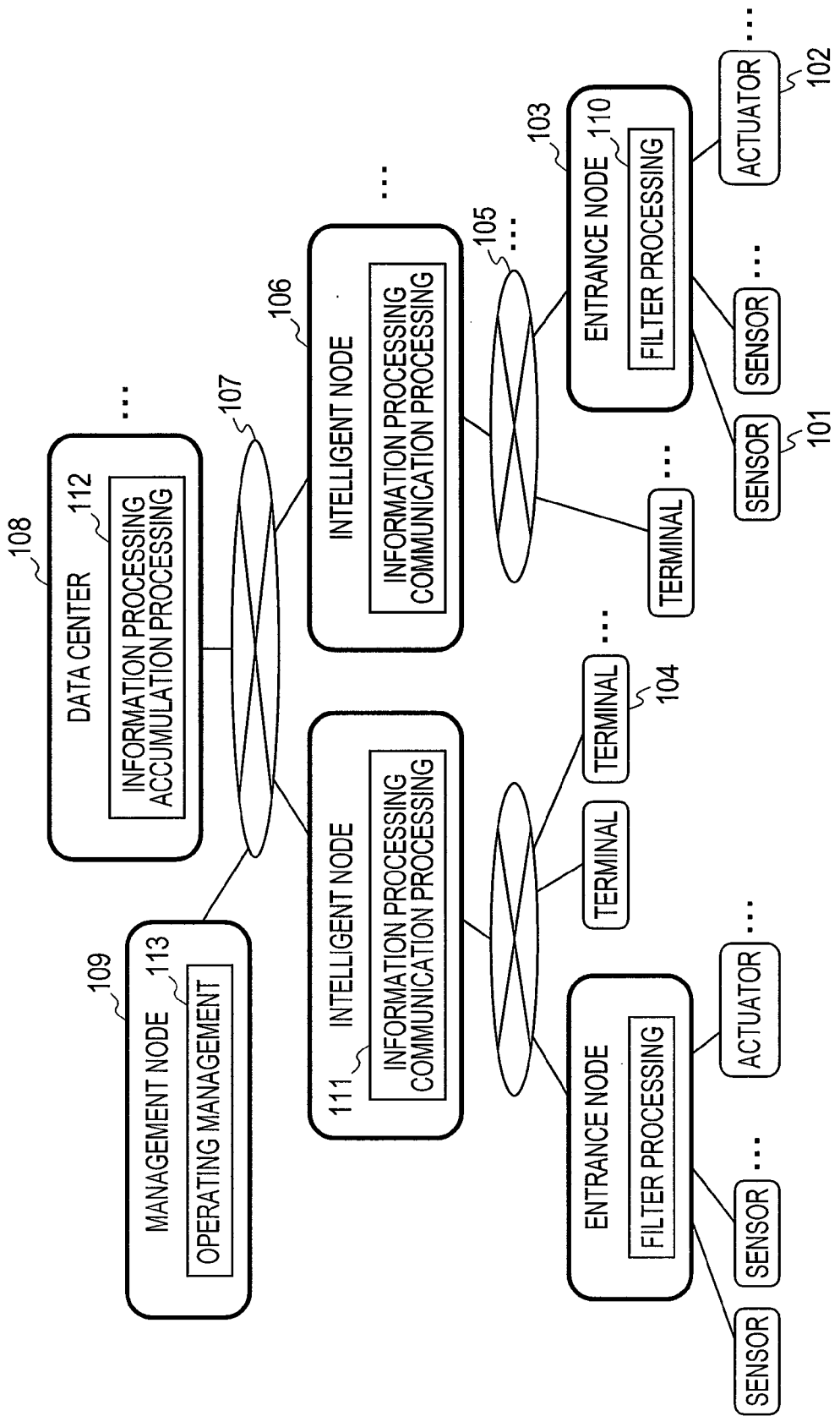
FIG. 1 is a concept block diagram of the reflective network system utilized in each of the embodiments of the present invention.

The embodiments of the present invention are described next while referring to the drawings. Each program executed by a central processing unit (CPU) contained in the servers and computers that comprise the data centers and nodes is sometimes referred to as "programs", "functions", or "units". Moreover, one should be aware that each type of node device, data center, and management node devices coupled to a network are called upstream nodes, except for the entrance nodes for performing high-efficiency clustering of sensor information that are coupled to multiple terminals such as sensors. These upstream nodes are a typical computer structure containing at least a processing section and storage unit and communication interface.

First Embodiment

FIG. 1 is a block diagram of the overall network system of the first embodiment.

The network system of the present embodiment is comprised of three types of nodes in a network hierarchy. First of all, an entrance node 103 installed at network terminal units coupled to information terminals and control devices such as the sensors 101 and the actuators 102 performs primary processing such as clustering and filtering of data corresponding to the real-time information. Next, the intelligent node 106 installed in the center section of the networks 105, 107, receives the information clustered by the entrance node 103 or the information from the terminal 104 by way of the network 105, and processes that information with more sophisticated secondary processing. In the case where allowing the intelligent node 106 to complete information processing without routing through the data center 108 serving as the center node for performing information processing and accumulation processing, a response to the control devices such as the end point actuator 102 can be made directly from the intelligent node 106 so that a faster response time can be achieved compared to the case where routing through the data center 108 of the related art. Moreover, a management node 109 for managing the communication paths on the network and operations such as of these nodes 103 and 106 is coupled to the network 107 in this system. This management node includes a typical computer structure and as described above, contains a communication interface and processing section for executing programs stored in the storage unit; and this processing section performs rewrite processing of configuration data such as for the entrance node 103 described later on and the data for each type of table, etc.

In FIG. 1, the respective processes and functions for the entrance node 103, the intelligent node 106, the data center 108, and the management node 109 denote the filter processing 110, the information processing and communication processing 111, the information processing and accumulation processing 112, and the operating management 113.

Figure 2:
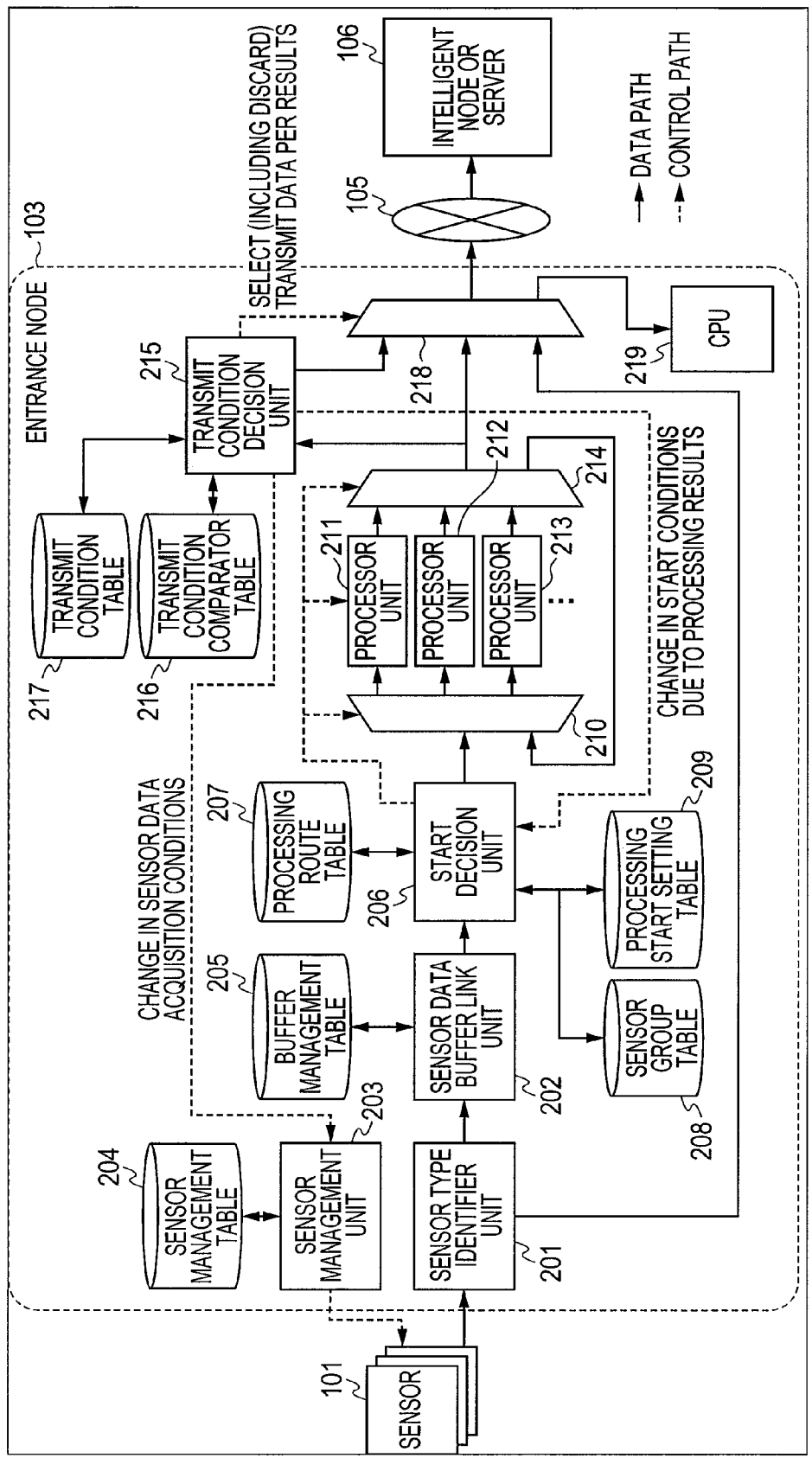
FIG. 2 is a block diagram showing a functional example of the entrance node in the first embodiment.

FIG. 2 is a block diagram showing a functional example of the entrance node in the network system structure in the above described first embodiment.

The entrance node 103 in this same figure contains a sensor type identifier unit 201 to receive sensor data from multiple sensors 101 and actuators 102 coupled for example by wireless communication. This sensor type identifier unit 201 identifies the type of sensor based on the received sensor data. The sensor data buffering unit 202 buffers the received sensor data according to the type of sensor, based on decision results from the sensor type identifier unit 201, and the information stored in the buffer management table 205.

The entrance node 103 further contains a sensor management unit 203 and a sensor management table 204 for sensor processing functions that manage the sensors 101 under its management and that set the sensor data acquisition conditions and transmit conditions. The arrows along the dashed line in this same figure show the control buses extending from the sensor management unit 203 to each the sensors 101.

The entrance node 103 further contains a start decision unit 206 for performing computation start functions that control the start-up of computations for the processor units described later on that process each of corresponding received and buffered sensor data. The start decision unit 206 starts computing of sensor data from the buffering unit 202 based on data accumulated in each table of the processing routing table 207, the sensor group table 208, and the processing start setting table 209 described in detail later on or in other words, controls the start-up timing and the processor units 211, 212, and 213 in the started computation unit. The multiplexers 214 and demultiplexers 210 are each installed at the input/output sections of the computation unit, and control the computing startup by controlling the required elements within these computation units by way of control signals from the start decision unit 206 on the control bus shown by the dotted line.

The entrance node 103 further has a transmission sequence control function for computing the results in the computation units. This function namely controls whether or not to transmit the computing results or buffered sensor data itself or event information along the network to the upstream node. The transmit condition decision unit 215 executes this function. The transmit condition comparator table 216 and the transmit condition table 217 described in detail later on, are coupled to the transmit condition decision unit 215 in order to implement this function. The transmit condition decision unit 215 controls the multiplexer 218 and selects and discards the transmit data based on the computation results.

Finally, the entrance node 103 also has a function to change the processing start conditions for designated sensor data based on the computation results. This function is capable of changing the type of processing and the start timing. These functions are implemented by control signals along the control bus shown by the dashed line extending from the transmit condition decision unit 215 to the sensor management unit 203 and the start decision unit 206.

The data accumulated in each type of table described in detail later on, can be rewritten from the processing section in the management node 109 byway of the intelligent node 106.

Summarizing the above information, the entrance node 103 contains the following functions:

A sensor management function (sets conditions for transmitting and acquiring sensor data)

A sensor data acquisition and sorting function (buffering into each sensor type)

A start function for computing the sensor data (controls the start timing and controls the start of the processor units)

A transmit sequence control function for the computation results (transmit or do not transmit to upstream, transmit of computing results or buffered sensor data or event data)

A function to change the processing start conditions for designated sensor data from the computing results (type of computing, and start timing).

An example of a specific hardware structure for the entrance node 103 for this embodiment is described next while referring to FIG. 3. The hardware for the entrance node 103 is comprised of a sensor and actuator coupler unit 301, a filtering processing section 302, and a management and control unit 303. The sensor and actuator coupler unit 301 is a section that couples the sensors 101 and or the actuator 102. The sensor and actuator coupler unit 301 internally contains a digital input/output unit (Digital I/O) 304, an Ethernet (registered trademark) Controller 305 and a bus 306 coupling the unit 304 and controller 305, etc. The bus 306 for example, utilizes an I/O serial interface such as PCI-Express.

The filtering processing section 302 contains two FPGA (Field Programmable Gate Array) 307, 308, and a CPU (Central Processing Unit) 309 functioning as a unit for program processing, and PROM (Programmable Read Only Memory) 310, 312 and SDRAM (Synchronous Dynamic Random Access Memory) 311, 313, and 314 that couple to these devices (307, 308, 309) and serve as storage units. A bus 315 and an interrupt line 316 are connected between the FPGA 307, 308 and the CPU 309. The management and control unit 303 is comprised of an Ethernet Controller 319, a CPU 317 and an SDRAM 318 coupled to the bus 320. The bus 320 also for example utilizes an I/O serial interface such as PCI-Express. The CPU1 309 corresponds to the CPU 219 shown in FIG. 2.

The management and control unit 303 manages the status information and manages the application being executed, in compliance with instructions from the management node 109 and the intelligent node 106. The filtering processing section 302 performs sensor information cluster processing including filtering. The filtering processing section 302 is capable of flexible, high-speed processing by rewriting the filter processing corresponding to each application being executed or coupled sensor by utilizing the FPGA 307, 308. The filtering processing section 302 in this embodiment is comprised of two FPGA so that one FPGA can continue operating to avoid having to stop the device functions during in-operation filter function rewriting. Needless to say however the number of FPGA is not limited to two devices.

The sensor and actuator coupler unit 301 contains various types of interfaces such as Ethernet terminal, digital I/O terminals, and serial terminals, in order to couple to the sensors 101 and the control devices as described above, etc. If the number of sensor 101 and actuator 102 couplings were increased, then the filtering processing load can be dispersed by installing more filtering processor units 302. The entrance node 103 is installed in large numbers at end points with the aim of utilizing built-in processors in the CPU 309 to achieve lower power consumption and compactness.

Figure 3:
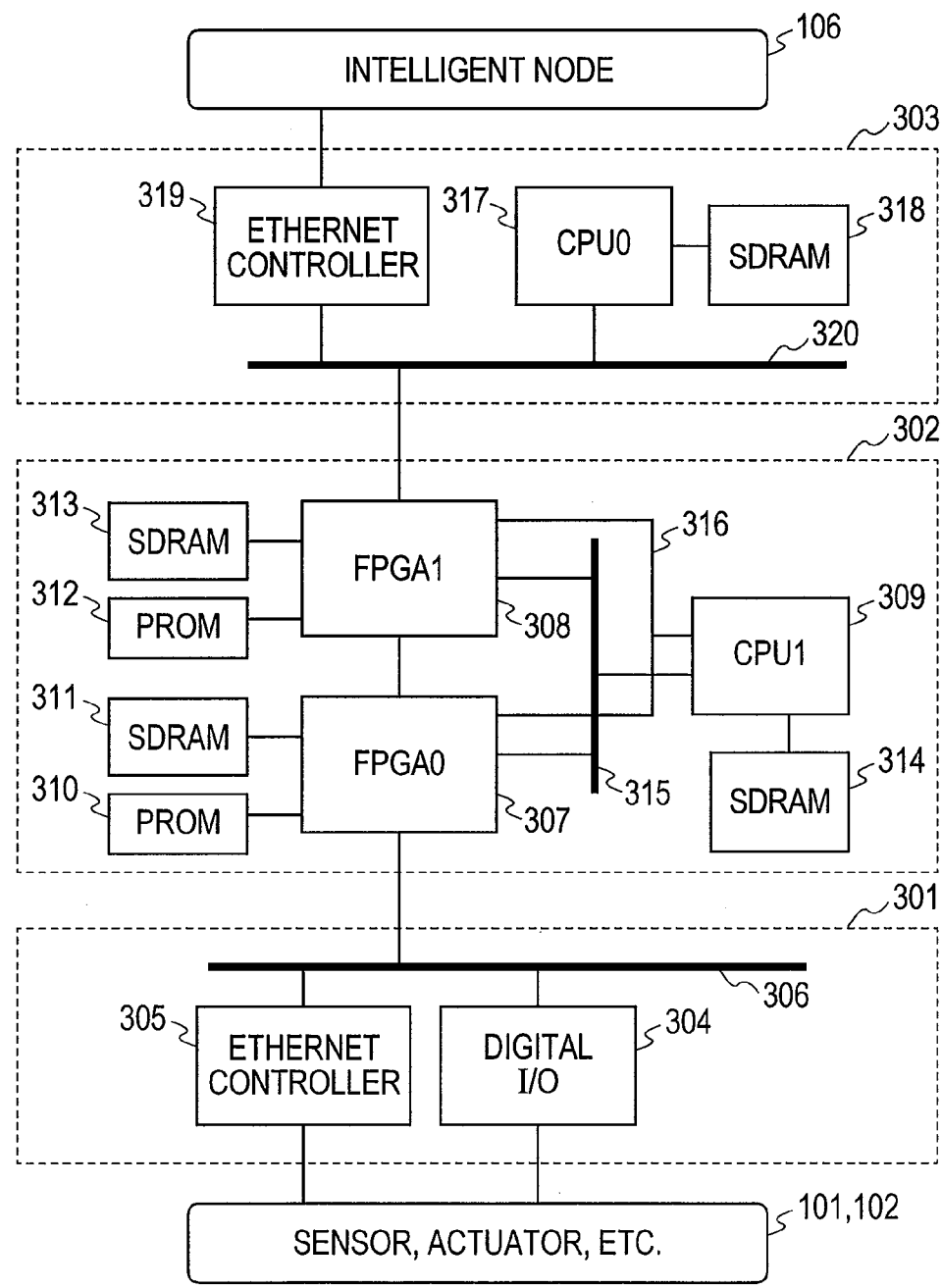
FIG. 3 is a block diagram showing a specific example of the hardware for the entrance node in the first embodiment.
Figure 4:
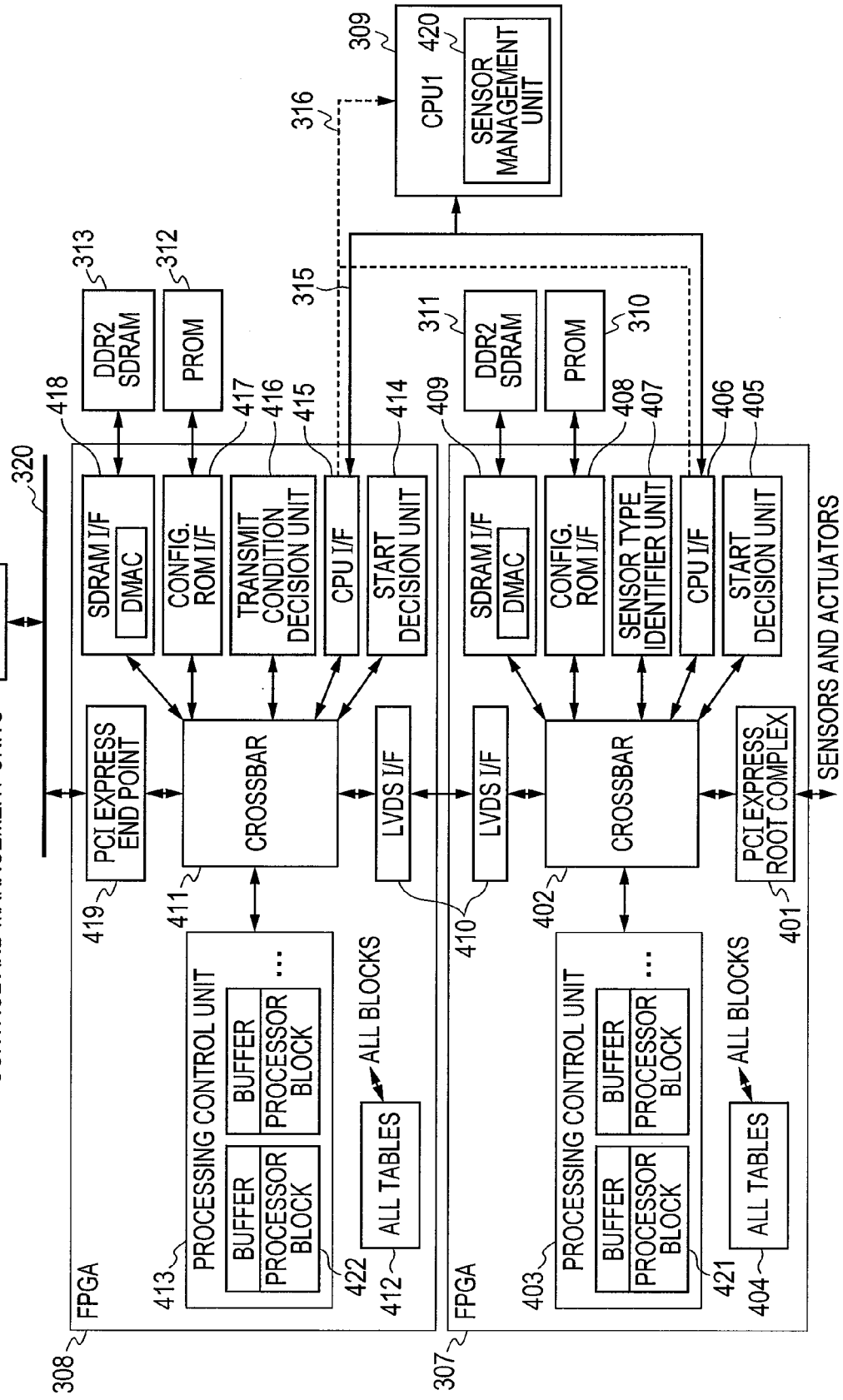
FIG. 4 is a block diagram showing a detailed example of an essential section of the entrance node in the first embodiment.

FIG. 4 is drawing showing an example of the internal structures of the filtering processing section 302 within the entrance node 1 of FIG. 3 and in particular the internal structures of the FPGA 307, 308. The filtering processing section 302 performs different types of high-speed filtering on each type of sensor data that was input and notifies the CPU0 317 and the management and control unit 303 with the results. The filtering processing section 302 also executes priority control of each type of sensor information. The two FPGA 307 and 308 within the filtering processing unit 302 implement the hardware logic for implementing this computing control.

Except for their data input/output interfaces, the two FPGA 307 and 308 possess identical structures. The PCI-Express Root Complex 401, PCI-Express End point 419, LVDS I/F (Low voltage differential signaling interface) 410 as the input/output interfaces, each type of external memory interface 406, 408, 409, 415, 417, 418 such as SDRAM, processing control units 403, 413 for filtering processing, and decision units such as the start decision units 405, 414 and sensor type identifier unit 407 and transmit condition decision unit 416 are mutually coupled by crossbars 402 and 411. Needless to say, these processing control units 403, 413, and decision units 405, 407, 414, 416 are capable of serving as reconfigurable devices to implement function logic for each of the FPGA 307 and 308 devices.

Each type of table 404, 412 retained within a dedicated region in the FPGA 307, 308 are coupled to each corresponding block by lines omitted from the drawing. Needless to say, these table types may also be stored in a memory such as an external SDRAM. The sensor management unit 203 utilizes the sensor management table 204 to execute sensor management functions executed on software in the CPU1 309. Each of the tables 404, 412 are rewritten by way of access from the CPU0 317, CPU1 309. The processing control units 403, 413, contain multiple processor blocks 421, 422 with buffers and that correspond to the processor units 211, 212, 213 in FIG. 2. The SDRAM I/F 409, 418 possess internal DMAC (Direct Memory Access Controllers).

In this embodiment, the processor blocks 421, 422 mounted in the entrance node 103 perform each type of filter processing. The desired processing can be performed in the desired sequence on data in the processor blocks by utilizing the crossbars 402, 411 to couple each interface and each memory to each of the processor blocks 421, 422. The crossbar 402, 411 settings are retained in the processing routing table 207 that defines the processing paths for each sensor type within each type table 404, 412. To control the data paths, identifiers (ID) are assigned to the processing blocks 421, 422 and each type interface, and header information comprised of ID expressing the destination ID and data type are attached to the data flowing through the crossbars 402, 411.

The logic of the FPGA 307, 308 shown in FIG. 4 also provide an interface for communication between the CPU0 317 of the management and control unit 303 and the CPU1 319 of filtering and feedback processing unit 302. Namely, instructions and data sent from the CPU0 317 are written into the communication buffer serving as the buffer region on the FPGA 307, 308 not shown in the drawing of the FPGA 308 by way of the PCI Express End Point 419. The CPU1 309 receives notification by way of this interrupt operation and communication from the CPU0 317 to the CPU1 309 can be achieved by reading (loading) into the applicable communication buffer. Communication from the CPU1 309 to the CPU 317 can be achieved by performing the above operation in reverse sequence in the same way. Needless to say, an external SDRAM may be utilized as the communication buffer.

Usage of the application for filtering computation is performed by plugging in various types of user-defined filtering computations into the processing blocks 421, 422, and reconfiguring the FPGA 307 and 308.

Specific examples of each table type in the entrance node 103 of this embodiment are described next using FIG. 5 though FIG. 11.

FIG. 5 is a drawing showing an example of the processing start setting table 209 shown in FIG. 2. The processing start setting table 500 in FIG. 5 is a table for accumulating data on processing start settings that correspond to each of multiple applications. The table 500 is a basic table for defining sensor data and the filtering computations required for the application, and for accumulating processing start conditions and so on. The horizontally arrayed items on the table 500 are described below in sequence.

Service ID: A unique ID for defining filtering computations and sensor data required by the application. Each line in the table for respective service ID corresponds to one of multiple applications.

Sensor ID: A physical ID that specifies the sensor 101. Searching the sensor management table 204 further acquires the type and attributes (data acquisition and transmit time) of the sensor 101. The "GR" listed on the third line of the processing start setting table 500 indicates the specified group.

Sensor Group ID: An ID that indicates the group specified for the multiple target sensors. In this case the same processing is performed on each sensor in the group.

Processing ID: An ID that specifies the processing (computation) type. Searching the processing routing table further reveals what processing is performed in what sequence.

Start Type: This item specifies the type of trigger condition for starting the processor units 311, 212, 213. The "Time" and "Data Count" in FIG. 5 for example can be utilized. This item specifies a corresponding value for the start condition described next.

Start Condition: This item specifies numerical values for trigger conditions to start the processor unit. In the case of time for example, the processor unit starts every 100 [ms] when the data count for that data reaches 50 [items].

Mode: In Mode, "ACC" is specified if sending all received data up to the start timing to the processor blocks, and "SMPL" is specified if sending only the latest data received at the start timing. This "SMPL" mode is utilized when for example information is only needed every 60 seconds for sensor data sent every two seconds, so that the data must be thinned out.

Priority: This item specifies the priority level during conflicts when the same sensors are likely to be jointly used on multiple applications and services.

Transmit ID: An ID for specifying processing of the computed results. The transmit condition table 217 is also searched as described later on.

FIG. 6 is a drawing showing a specific example of the sensor group table 208. In this same figure, the sensor group table 600 is a table for defining the sensor ID of the actual sensors corresponding to the sensor group ID along the horizontal axis in the processing start setting table 500 in FIG. 5. There are combinations of various sensors corresponding to the sensor group ID as in the examples shown on each line.

FIG. 7 is a drawing showing a specific example of the processing routing table 207. This table 700 shows in what sequence to start the processor units, or in other words the processing blocks for the processing ID in the processing start setting table 500 in FIG. 5. The processing routing table 700 in this same figure specified the processor unit or namely the processing block ID. One processor unit jointly uses multiple processing ID. If there is a conflict then other processing is made to wait until that processing is complete. A processing block buffer is provided for that waiting process. If sending the computation results to the transmit condition decision unit 217 then "OUT" is specified.

In FIG. 7, a processing ID of "1" for example indicates first of all starting the processor unit "2", executing the processing, and transferring those results to the processor unit "4" executing them and outputting them to the transmit condition decision unit 215. As described above each processor unit is capable of distributing data from the processing section of the management node 109 as configuration data.

FIG. 8 is a drawing showing one example of the transmit condition table 217. Along with indicating the transmit destination for the computation results, the transmit condition table 800 sends data only for a designated condition by arithmetic comparison with values from the computation results, combined with the transmit condition ID.

The horizontally arrayed items on the transmit condition table 800 in this same figure are described next in sequence.

Transmit ID: An ID for specifying transmit.

Transmit destination: This item selects transmit to its own CPU or transmit to an external location. If not performing detection by simple comparison then the results are sent unchanged to the CPU along with the service ID, and the transmit conditions can also be calculated by software processing.

Transmit type: This item specifies the data to set as the object for transmission. "Computation results" indicates the computation results in the processor unit. "Event" sends just the service ID of interest as the event when the transmit conditions were detected. "Buffer data" sends the original sensor data serving as the object for processing unchanged.

Transmit condition ID: This item indicates the conditions for making the transmit decision.

Transmit destination IP address: This item specifies the IP address for the transmit destination.

Transmit destination report: This item specifies the port of the transmit destination.

FIG. 9 is a drawing showing an example of the transmit condition comparator table 216 in this embodiment. This table 900 defines the arithmetic comparison computation for deciding if transmit conditions for the computation results are satisfied.

The horizontally arrayed items on the transmit condition comparator table 900 in this same figure are described next in sequence.

Transmit condition ID: This item indicates the ID for identifying the condition method.

Comparator: This item shows the arithmetic comparator. In this same figure, LT indicates "less than", MT indicates "more than", EQ indicates "equal", LTE indicates "less than or equal", NEQ indicates "not equal", and MTE indicates "more than or equal."

Setting value: This item indicates the comparison value.

FIG. 10 is a drawing showing an example of the sensor management table 204 in this embodiment. The table 1000 is for managing each sensor. This table the also specifies acquisition and transmit conditions for the sensor data.

The horizontally arrayed items in this sensor management table 1000 in this same figure are described next in sequence.

Sensor ID: This is a unique ID specified for each sensor.

Sensor type: This item indicates the functions of each sensor.

Transmission rate: This item specifies the rate of acquisition and transmission of data for each sensor.

Sensor identifier: This is an ID for identifying the sensor. If the sensor is an IP sensor then this item specifies an IP address. If a digital I/O shown in FIG. 2, then this item specifies a corresponding port number.

Sensor status: This item is capable of specifying the pausing of the sensor.

FIG. 11 is a drawing showing an example of the buffer management table 205. This table 1100 is utilized for buffering memories and ring buffer management. The table specified the buffering region for the sensor data, and manages the buffered data volume and time stamp.

The horizontally arrayed items in this buffer management table 1100 in this same figure are described next in sequence.

Buffer ID: An ID for identifying the buffer.

Size: This item indicates the obtained buffer capacity.

Lead position: This item shows the lead address of the target buffer.

Tail position: This item shows the tail address of the target buffer.

Unit Data Size: This item shows the data size for the data sent from a single sensor.

Latest Data Pointer: This item shows the pointer address for storing the latest data.

Latest Data Time Stamp: This item shows the time stamp for the latest stored data.

Tail Data Time Stamp: This item shows the time stamp for the oldest stored data.

A specific example for each type of table content in the entrance node 103 for this embodiment is described above. Then, the processing of data for each sensor, and the rewrite (update) processing from the processing section of the management node 109 for each type table in the entrance node 103 are described using FIG. 12 and FIG. 13.

Figure 12:
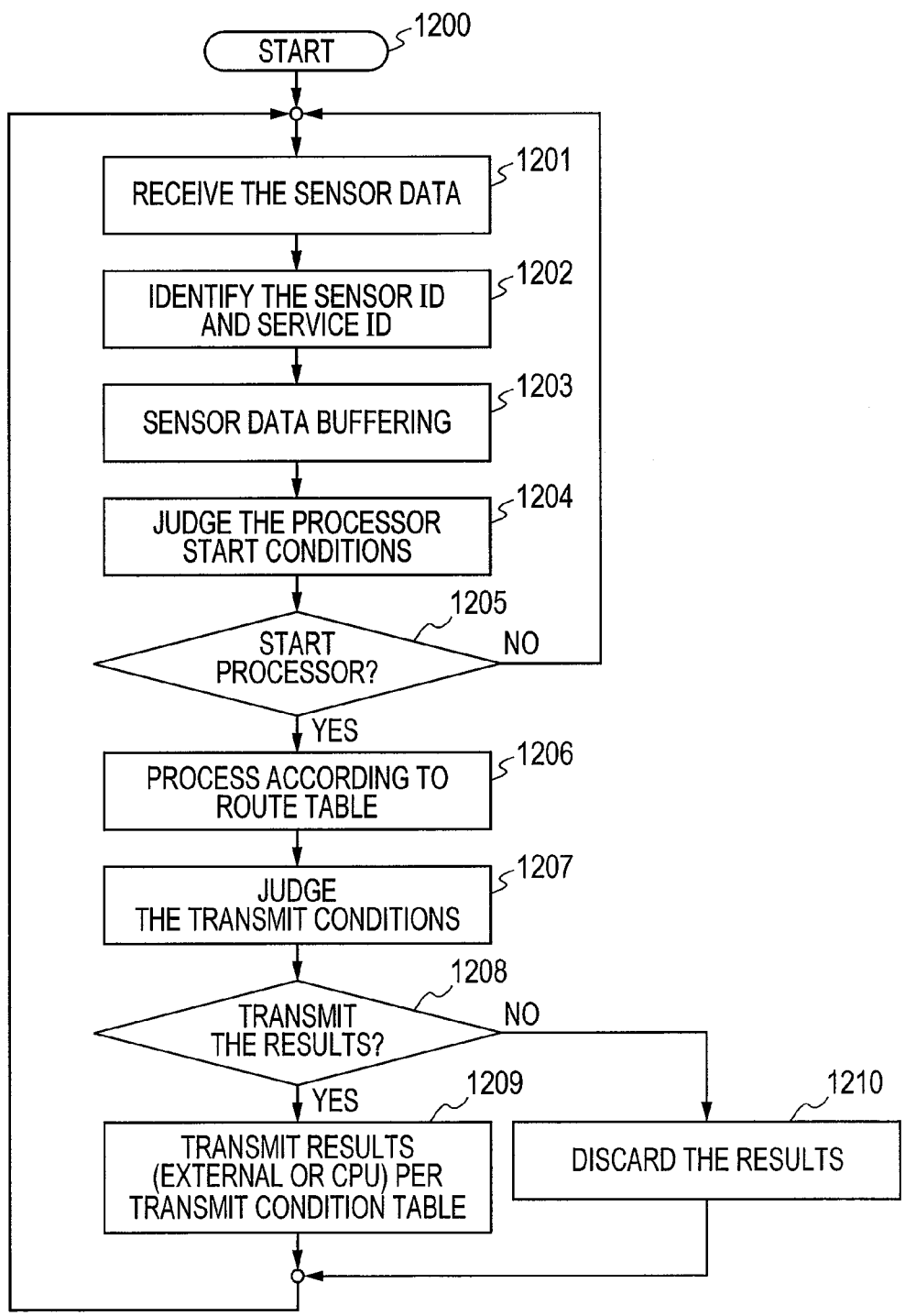
FIG. 12 is a drawing showing the process flow for each sensor data in the first embodiment.

First of all in the entrance node 103 in FIG. 12, when processing of the sensor data starts in step 1200, the receiving of sensor data starts (step 1201, the word "step" is hereafter omitted within the parentheses); the sensor type identifier unit 201 identifies the service ID and the sensor ID of each sensor data (1202); and the sensor buffering unit 202 buffers the sensor data based on decision results (1203). The start decision unit 206 decides the processor unit start conditions for the buffered sensor data (1204). If those decision results are that there is no processor unit start (N in 1205) then the operation returns to receiving of sensor data (1201).

If the decision results are processor unit start (Y in 1205), then the selected processor units 211, 212, 213 process the sensor data according to the processing routing table 207 (1206). Finally, the transmit condition decision unit 215 decides whether or not to transmit the computation results based on the computation results (1208). If those results are negative, (N in 1208) then the results are discarded (1210), and if those results are required (Y in 1208), then those results are sent to an external location or the CPU1 309 according to the transmit condition table (1209).

Figure 13:
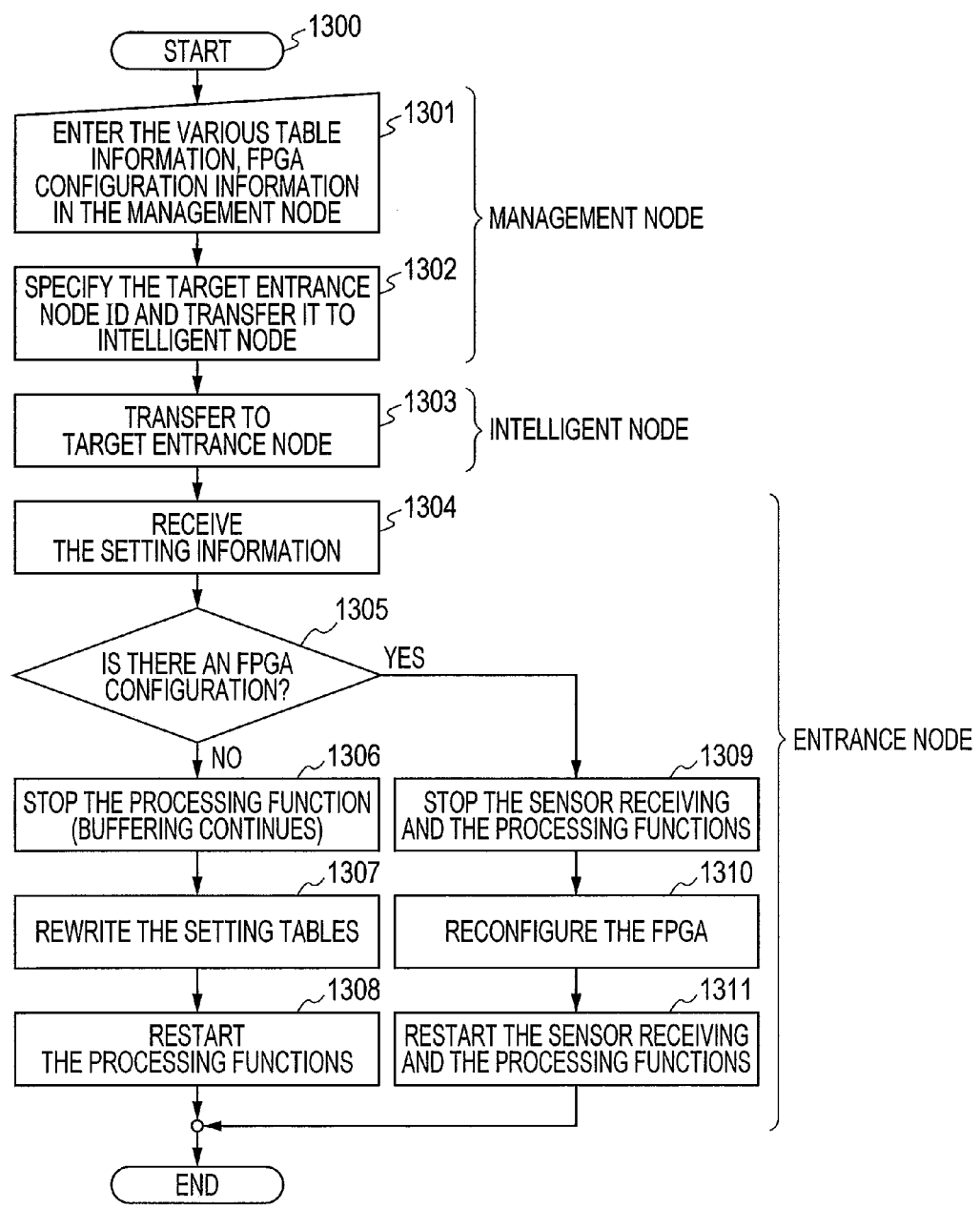
FIG. 13 is a flow chart showing the rewrite processing in each type of table in the first embodiment.

Next, in FIG. 13, when the processing section within the management node 109 starts the rewrite (update) process flow in step 1300, then first of all, the processing unit in the management node 109 inputs the various types of table information, and the FPGA configuration information (1301) specifies the target entrance node ID, and transfers it to the intelligent node 106 (1302). The intelligent node 106 then performs transfer to the target entrance node 103.

Each of the entrance nodes 103 receives the setting information (1304). The entrance nodes 103 then check whether there is a PFGA configuration or not (1305) and if the results are negative (N in 1305), then the processing function is stopped while the buffering continues (1306). Each type of setting table is then rewritten based on each type of table information (1307) and the processing function is restarted (1308). However if results are positive (Y in 1305) then sensor data receiving and processing functions are stopped (1309), the FPGA is reconfigured (1310) and sensor data receiving and processing functions are restarted (1311).

The structure and function of the network system of the first embodiment were described above. An example for applying the system of this embodiment describes usage in a system that makes use of multiple applications utilizing temperature sensor data as shown in FIG. 14 through FIG. 22.

Figure 14:
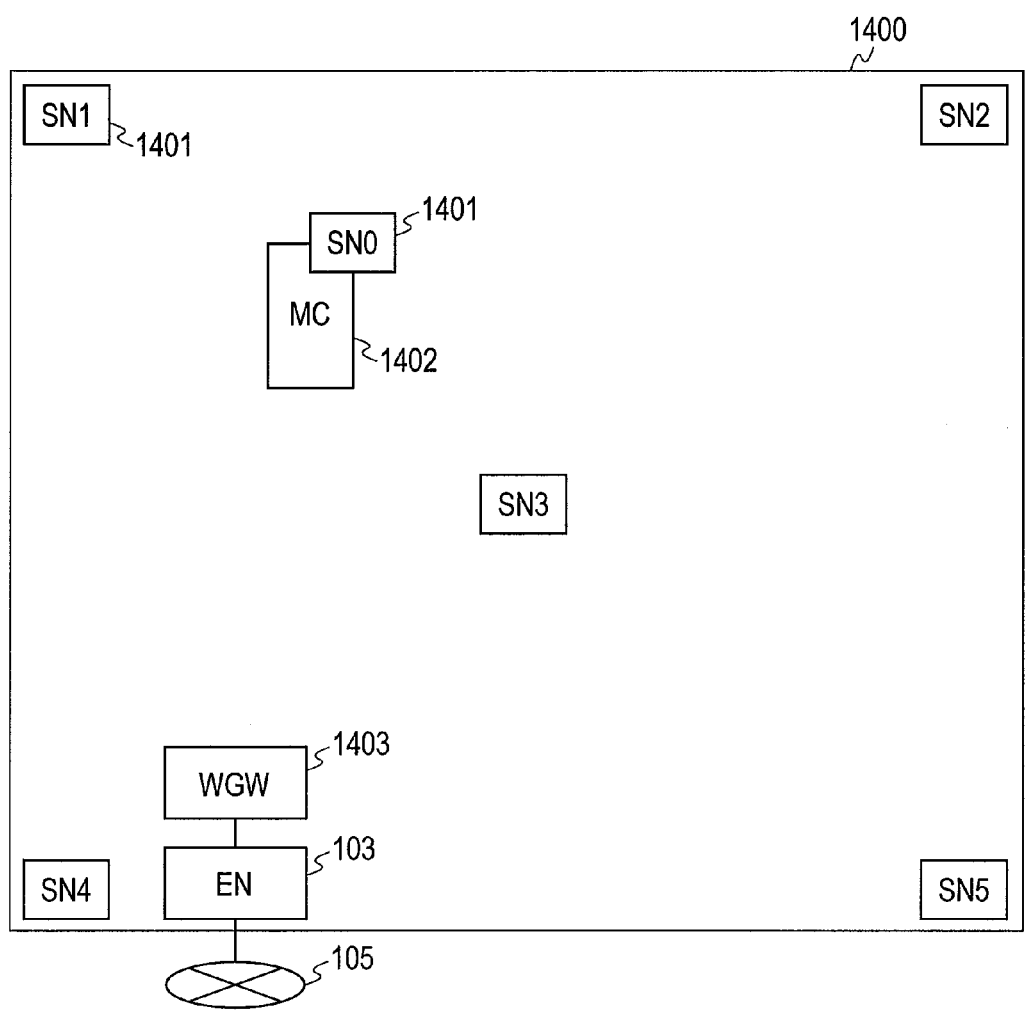
FIG. 14 is a diagrammatic view for a system utilizing applications in an example applied in the first embodiment.

FIG. 14 is a diagrammatic view of a system applied to applications using temperature sensors. There are five temperature sensors 1401 (SNx; x denotes the ID, 1 through 5) installed in the room space 1400 such as in a factory. These temperature sensors 1401 (SN0) are also attached to the machine device (MC) 1402 that is the monitoring target installed within the applicable room space 1400. The output from these temperature sensor 1401 (SN0, 1 through 5) is sent by way of the wireless gateway (WGW) 1403 to the above described entrance node (EN) 103. Three user applications serving as the applications are operated in the entrance node (EN) 103 within the application system.

(1) Air Conditioning Control Application

To control the air conditioning within the applicable space, the application measures the temperature at the temperature sensors SN 1-5 every thirty seconds, and calculates the overall average for each sensor within a one minute period. The application sends that average value for the applicable space for a one minute period to the upstream intelligent node 106 or the server by way of the network 105, and regulates the air conditioning device using those results.

(2) Machine Maintenance Monitoring Application

This application monitors the temperature of the machine for possible abnormal temperatures. The application accumulates a 100 point (200 second period) portion of temperatures measured every two seconds, and compares the temperature distribution for the 100 point portion with a pre-determined abnormal trend pattern, and sends the degree of similarity upstream. In this calculation, the average value for a total four point portion of data including the prior 3 point portion of points of interest is set as the applicable point of interest data (smoothing for eliminating noise). The derivative for each point is next calculated and the degree of similarity then derived by finding distance between calculated results for the derivative and the pre-determined abnormal trend pattern data. The FPGA1 307, FPGA1 308 for the above described entrance node 302 calculate this average value and derivative, and the CPU1 309 calculates the distance.

(3) Machine Abnormal Monitoring Application

This application monitors the machine for abnormalities by judging the temperature. The application measures the temperature every two seconds and if a temperature above a fixed value is detected, sends this event to the upstream intelligent node 306 or the server.

The management node 109 distributes information in each table for operating these applications by way of the intelligent node 106 to the entrance node 103. The management software in the entrance node 103 rewrites (updates) each table. The processing blocks 421, 422 in the FPGA utilized in this application are of the following three types. The processing sections in the management node 109 distribute FPGA configuration information including circuits for these processing blocks in the same way. The processing blocks are in this way configured by the management software of entrance node 103 that uses this configuration information to rewrite the FPGA.

The processing blocks possess the following functions.

Average value calculation (processing block ID=0)

The function calculates and outputs the average value for multiple data items that were input. The (1) air conditioning control application utilizes this function.

Filter processing (processing block ID=1)

This function performs smoothing filtering, calculates an average value for the applicable total of four points of input data including three points of data previously retained in the buffers within the block, and each input data, and outputs these results. This function makes consecutive calculations with this plural input data, and outputs the results. The (2) machine maintenance monitoring application utilizes this function.

Derivative calculation (processing block ID=2)

This function calculates and outputs the derivative (slope) for the results that were output by the (2) machine maintenance monitoring application. The (2) machine maintenance monitoring application utilizes this function.

Figure 17:
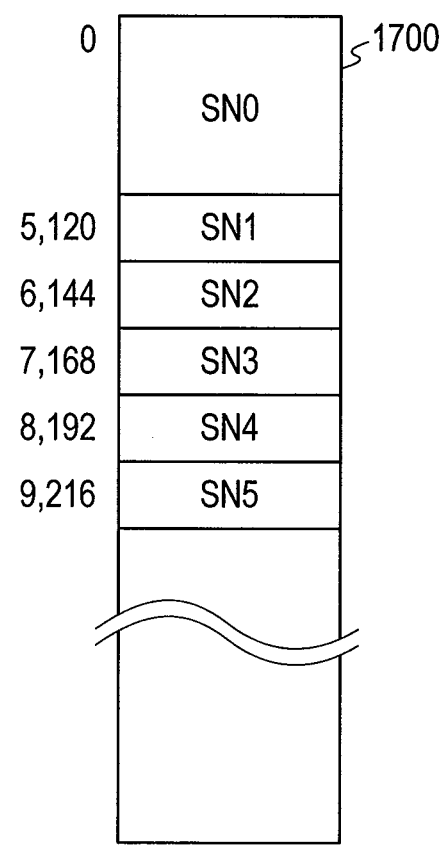
FIG. 17 is a drawing showing an example of region memory map corresponding to the buffer ID in an example applied in the first embodiment.

FIG. 15 through FIG. 22 show actual examples of table types for application systems utilizing temperature sensor data in these applications. FIG. 15 shows the temperature sensor management table 1500. FIG. 16 shows the buffer management table 1600. FIG. 18 shows the sensor group table 1800. FIG. 19 shows the processing start setting table 1900. FIG. 20 shows the processing routing table 2000. FIG. 21 shows the transmit destination specifier table 2100. FIG. 22 shows the transmit condition comparator table. FIG. 17 shows a memory map of the region corresponding to the buffer ID in FIG. 16.

The temperature sensor management table 1500 in FIG. 15 sets the acquisition (transmit) rate for each sensor. The sensor ID=0 (SN0) acquires the temperature every two seconds for machine monitoring use as described above. The sensor ID=1-5 (SN1 through SN5) acquires the temperature every ten seconds for room monitoring measurements for air conditioning control.

The buffer management table 1600 in FIG. 16 shows the locations storing data from each sensor. The region size along the horizontal axis in the same figure indicates the size of the region storing each data. The region address is specified by the lead position and the tail position. The buffer ID0 is a region retaining data for the temperature sensor SN0; and the buffers ID1-5 are regions corresponding to the temperature sensors SN1-5. Sensor data from the temperature sensor SN0 arrives at five times the rate of the temperature sensors SN1-5 so that the ID0 buffer is set to 5,120 bytes, and the ID 1-5 are set to 1,024 bytes.

The unit data size is the data size for one data item from each sensor; and temperature data is expressed by two bytes. The latest data (storage) pointer indicates the most recent address. The time stamp indicates the unique time ID from the start of sensor data acquisition.

FIG. 17 shows a memory map 1700 corresponding to the buffer ID.

The sensor group table 1800 shown in FIG. 18 for handling the sensors SN1-SN5 (sensor ID=1 through 5) used in air conditioning as sensor groups.

The number in the processing start setting table 1900 in FIG. 19 indicates the service ID that corresponds to the applications (1) through (3). Namely, ID0=(1) Air conditioning control ID1=(2) Machine maintenance monitoring ID2=(3) Machine abnormal monitoring The Sensor ID item in the same figure indicates the sensors utilized in each service. The SN1 through SN5 are handled as groups in the service ID0. The sensor group ID specifies the ID ("0") of the sensor group table when the sensors are set in groups. The processing ID specifies the processing (computation) function for specifying the processing routing table. The ID0 shows the average value calculation, the ID1 shows the smoothing filter+derivative calculation, and the ID2 shows the no calculation.

The Start Condition item shows the timing for starting the computation. The timing for the service ID0 is every 60 seconds, the ID1 is every 300 seconds, and the ID2 is everyone data item. The Mode specifies whether to discard or to send data received within the time specified in the start conditions to the processor block. Here, "ACC" transmits all the received data to the processor block, and "SMPL" as described above, sends only the latest data received at the timing that the processor block started.

The Priority item shows higher priorities with a higher number. The abnormal monitoring in ID2 is a "10" because it is the highest priority. Next, the maintenance monitoring of ID1 is a "5", and the air conditioning control of ID0 is a "1"

because of the lowest priority. The Transmit ID item shows the ID for searching the transmit condition table that defines the transmit destination and conditions for the computation results.

The processing routing table 2000 in FIG. 20 specifies the processing block (function) utilized in each application.

In this same figure; the computation ID0 (air conditioning control) first of all starts the processor block 0 and calculates the average value of the input data (60 second portion of sensor data for 5 units at 30 seconds each) and outputs that average value to the result decision unit. The computation ID1 (machine maintenance monitoring) first of all starts up the processor block 1 for the input data and executes smoothing filter processing. Those results are next transferred to processor block 2 and the derivative is calculated, and output to the result decision unit. The computation ID2 (machine abnormal monitoring) outputs those results unchanged to the result decision unit, without transferring them to the processor block.

The transmit destination specifier table 2100 in FIG. 21 specifies the transmit destination of the computation results for each service ID.

The Transmit ID0 (air conditioning control) in this same figure, sends the computation results to an external location (specified IP address and port). The Transmit Condition is Any and results are sent upstream simultaneous with output. The Transmit ID1 (machine maintenance monitoring) transmits the computation results to CPU0. The Transmit Condition is Any and results are sent to CPU0 simultaneous with output. The Transmit ID2 (machine abnormal monitoring) sends the computation results to an external location (specified IP address and port). The Transmit Condition ID is 0 and a search is made of the transmit condition comparator table and if conditions are satisfied then the event information (abnormal status information) is sent upstream.

The transmit condition comparator table 2200 in FIG. 22 defines the transmit conditions. If the computation results are more than or equal to 50 then the condition is satisfied. Namely, the state is judged as an abnormal temperature of 50 degrees or higher.

This invention relates to a node device and is effective as an information processing technology for efficiently filtering plural types of sensor information at the network end point.

What is claimed is:

1. A node processing device to send data corresponding to a plurality of applications over a network, comprising:
    a processor; and
    at least one memory area storing instructions that, when executed by the processor, instruct the processor to execute:
    a sensor type identifier unit to receive sensor data from a plurality of sensors and identify different sensor types of the sensors;
    a buffering unit to accumulate the sensor data into the sensor types based on identification results from the sensor type identifier unit;
    a computation unit to perform computation processing for the sensor data of each respective sensor type accumulated in the buffering unit, according to processing start conditions corresponding to a respective one of the applications, where the computation unit includes a plurality of processor units; and
    a transmit condition decision unit to decide transmission conditions for computation results from the computation unit based on the computation results,
    wherein the at least one memory area stores a processing routing table containing accumulated start sequences for the processor units corresponding to a computation type of the sensor data, and a transmit condition comparator table containing accumulated decision computations to decide whether or not the computation results satisfy transmission conditions,
    wherein a start decision unit sequentially starts the processor units corresponding to the computation type, based on the processing routing table, and changes the sequential starting and computation type of the processor units according to the computation results, and
    wherein the transmit condition decision unit decides to transmit the computation results from the computation unit based on the transmit condition comparator table.

2. The node processing device according to claim 1, wherein:
    the computation types are specified for the sensor data in each of the applications;
    a processing start setting table to accumulate computation types for the sensor data for each of the applications and start conditions to execute the applicable computation type; and
    a start decision unit to decide to start computation for each type of the sensor data accumulated in the buffering unit based on the processing start setting table.

3. The node processing device according to claim 1, wherein
    wherein the start decision unit changes the sequential starting and computation type of the processor units according to the computation results of respective sensor types.

4. The node processing device according to claim 1, wherein operation of the computation unit is stopped, and the processing routing table and transmit condition comparator table are rewritten based on accumulated information, when the accumulated information is received from a management node over a network.

5. The node processing device according to claim 1, wherein the receiving of sensor data from the sensors and computing in the computation unit are stopped, and reconfiguring thereof is performed based on configuration data, when the configuration data for the processor units in the computation unit is received from a management node over the network.

6. The node processing device according to claim 1, further comprising:
    a transmit condition table to accumulate the transmit conditions including at least one transmitted data type and at least one transmission destination for the computation results, based on the computation results in the computation unit, and
    wherein the transmit condition decision unit controls the transmission of computation results corresponding to the transmit data type to the transmission destination based on the transmit condition table.

7. The node processing device according to claim 1, further comprising:
    a sensor management table to acquire the different sensor types, acquire the sensor data and accumulate a transmission rate thereof, and
    a sensor management unit to manage the sensors based on the sensor management table.

8. A node system including a management node device coupled to an entrance node device that transmits data corresponding to a plurality of applications over a network, the node system comprising:
    the entrance node device having:
    a processor; and at least one first memory area having instructions that, when executed by the processor, instruct the processor to execute:
- a sensor type identifier unit to receive sensor data from a plurality of sensors and identify different sensor types of the sensors;
- a buffering unit to accumulate the sensor data into the sensor types based on identification results from the sensor type identifier unit;
- a computation unit to perform computation processing for the sensor data of each respective sensor type accumulated in the buffering unit, according to processing start conditions corresponding to a respective one of the applications, where the computation unit includes a plurality of processor units;
- a transmit condition decision unit to decide transmission conditions for computation results from the computation unit based on the computation results; and
- the at least one first memory area to store a processing routing table containing accumulated start sequences for the processor units corresponding to a computation type of the sensor data, and a transmit condition comparator table containing accumulated decision computations to decide whether or not the computation results satisfy transmission conditions,
- wherein a start decision unit sequentially starts the processor units corresponding to the computation type, based on the processing routing table, and changes the sequential starting and computation type of the processor units according to the computation results, and
- wherein the transmit condition decision unit decides to transmit the computation results from the computation unit based on the transmit condition comparator table; and the management node device having:
- a management node processor; and
- at least one second memory area storing computation unit configuration data of the entrance node device and storing instructions that, when executed by the management node processor, instruct the management node processor to execute processing which:
  - receives the sensor data from the entrance node device, executes computation processing of the sensor data according to the processing start conditions corresponding to the respective one of the applications, and rewrites the computation unit configuration data according to the computation processing, and
  - distributes computation unit configuration data to the entrance node device,
- wherein the entrance node device performs the computation processing for the sensor data of each respective sensor type accumulated in the buffering unit according to the computation unit configuration data distributed by the management node.

9. The management node device according to claim 8, wherein the management node processor instructs to distribute computation unit configuration data to the entrance node device to reconfigure a processing start setting table thereof.

10. An information processing method for a node processing device that receives sensor data from a plurality of sensors coupled to an upstream node over a network, the method comprising:
- receiving sensor data from the sensors and identifying different sensor types of the sensors;
- accumulating the sensor data into the sensor types based on the identified different sensor types;
- sequentially starting a plurality of processor units of the node processing device by referring to a processing routing table containing accumulated start sequences according to a computation type of the sensor data;
- executing computation processing with the processor units for the sensor data of each respective sensor type according to processing start conditions required for each of a plurality of applications;
- deciding transmission conditions for computation results from the computation processing executed by the processor units based on the computation results;
- deciding whether the computation results satisfy transmission conditions by referring to a transmit condition comparator table containing accumulated decision computations; and
- transmitting the computation results according to the decided transmission conditions,
- wherein the sequential starting of the processor units and computation type are changed according to the computation results,
- wherein the processing routing table contains the accumulated start sequences for the processor units corresponding to the computation type of the sensor data, and the transmit condition comparator table contains the accumulated decision computations to decide whether or not the computation results satisfy transmission conditions.

11. The information processing method according to claim 10, further comprising:
starting the computation processing for each respective sensor type of the sensor data based on a processing start setting table containing accumulated computation types for the sensor data for each of the applications and start conditions for executing the applicable computation type.

12. The information processing method according to claim 11, further comprising:
stopping the computation processing of the processor units, and rewriting the processing start setting table based on distributed information received from the upstream node device over the network.

13. The information processing method according to claim 10, further comprising;
stopping the computation processing of the processor units, and performing reconfiguration based on configuration data received from the upstream node device over the network.

14. The information processing method according to claim 10, further comprising;
controlling transmission so that a transmitted data type and a transmit destination of the computation results are sent from the node processing device to an external location, based on the computation results from the computation processing of the processor units.

* * * * *